United States Patent [19]

Asai et al.

[11] 4,005,488
[45] Jan. 25, 1977

[54] TAPE-OPERATING APPARATUS ADAPTED FOR USE EITHER WITH AN ENDLESS LOOP TYPE CARTRIDGE OR A COPLANAR TYPE CASSETTE

[75] Inventors: Satosi Asai, Annaka; Isamu Matsuki, Maebashi, both of Japan

[73] Assignee: Matsuki-Seisakusho, Maebashi, Japan

[22] Filed: June 26, 1975

[21] Appl. No.: 590,476

[30] Foreign Application Priority Data

Oct. 31, 1974 Japan .............................. 49-125768
Nov. 6, 1974 Japan .............................. 49-127742

[52] U.S. Cl. ................................................ 360/94
[51] Int. Cl.² ........................................ G11B 15/00
[58] Field of Search ........................... 360/94, 96

[56] References Cited

UNITED STATES PATENTS

| 3,578,261 | 5/1971 | Yamamoto et al. | 360/96 |
| 3,594,008 | 7/1971 | Takagi et al. | 360/94 |
| 3,703,295 | 11/1972 | Yamamoto et al. | 360/94 |

Primary Examiner—Robert S. Tupper
Attorney, Agent, or Firm—Steele & Petock

[57] ABSTRACT

A tape-operating apparatus adapted for use either with an endless loop type cartridge or a coplanar type cassette which comprises a fixed frame; a movable frame movably fitted to the fixed frame; cassette tape-operating means provided on the movable frame; and guiding means for guiding the movable frame from an inoperative position to an operative position so that the movable frame is lifted obliquely upward and then horizontally moved.

7 Claims, 20 Drawing Figures

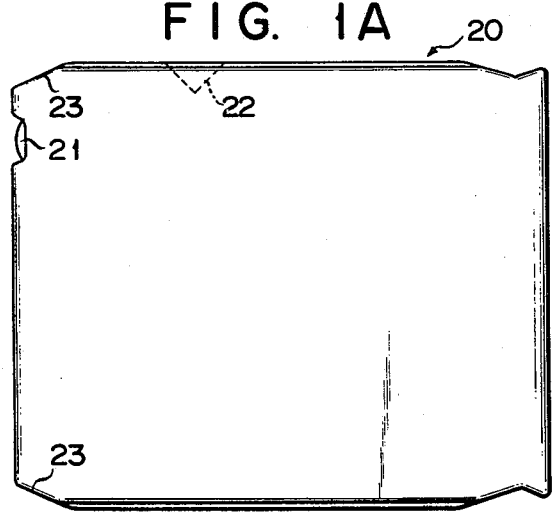
FIG. 1A
FIG. 1B
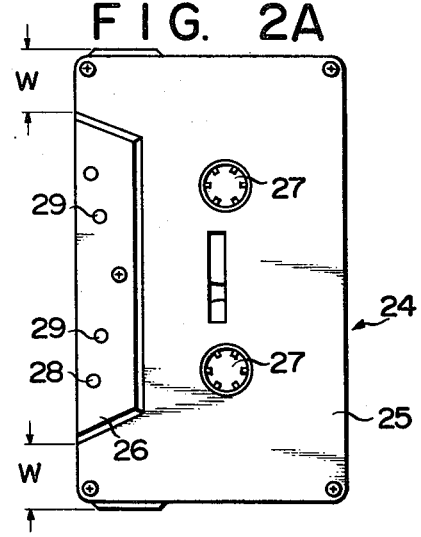
FIG. 2A
FIG. 2B
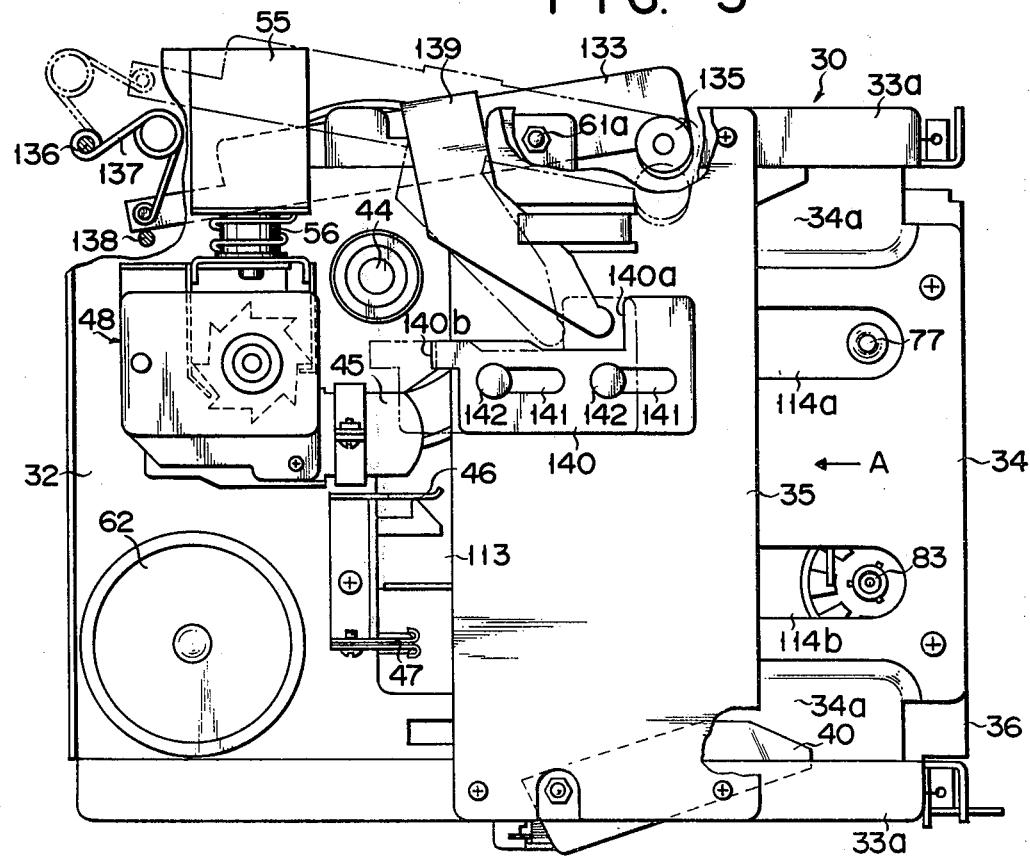
FIG. 3

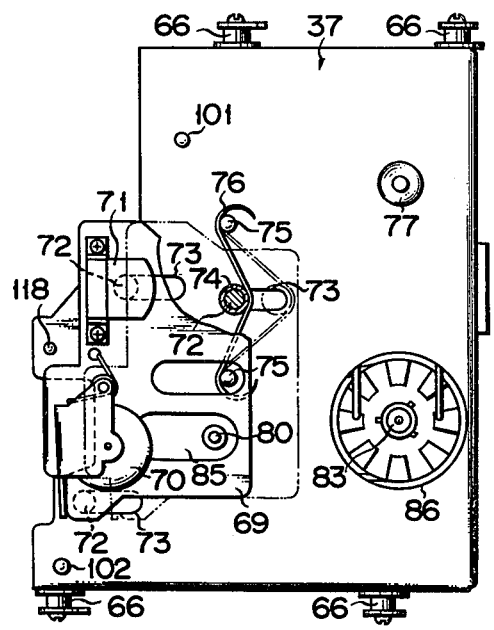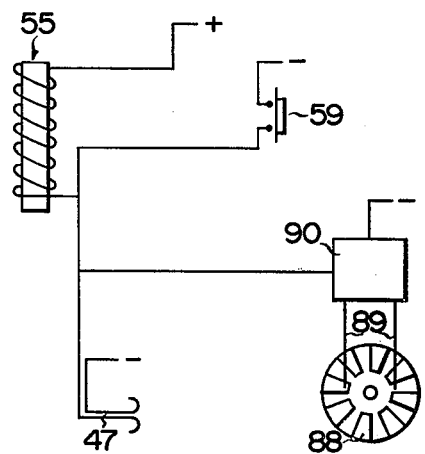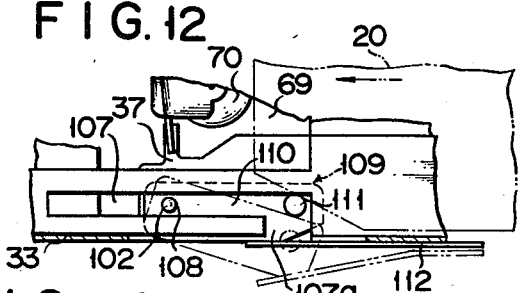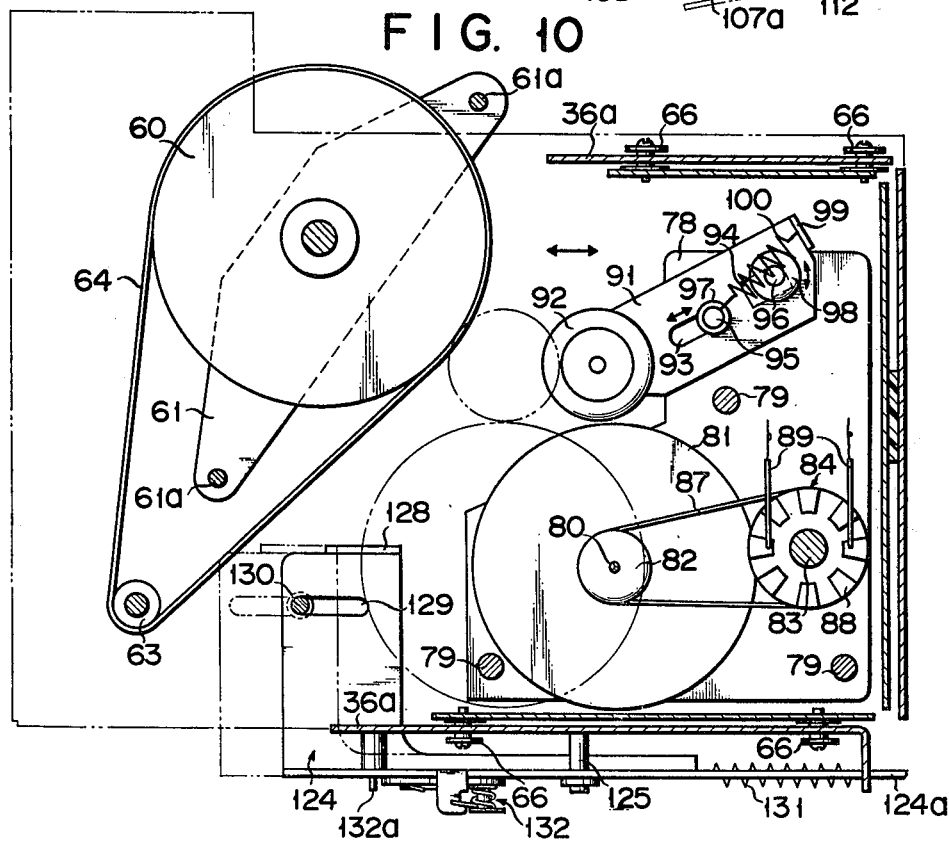

TAPE-OPERATING APPARATUS ADAPTED FOR USE EITHER WITH AN ENDLESS LOOP TYPE CARTRIDGE OR A COPLANAR TYPE CASSETTE

BACKGROUND OF THE INVENTION

This invention relates to a tape-operating apparatus for recording and reproduction of sounds which is adapted for use with an endless loop type cartridge or a coplanar type cassette. Ordinary compact magnetic tape holders are broadly divided into an endless loop type cartridge and coplanar type cassette. Both types of tape holder have different characteristics and shapes, requiring separate sound recording and reproducing devices for the cartridge and cassette, as has been the case in the past. If a single tape-operating apparatus could be developed which is adapted for use with both types of tape holder, then recording and reproduction of sound using a magnetic tape would be carried out very conveniently. Under the present circumstances, however, where an attempt is made to incorporate two forms of sound recording and reproducing function in a single device, then said device would be rendered bulky and complicated in mechanical setup, giving rise to difficulties in operation.

SUMMARY OF THE INVENTION

It is accordingly an object of this invention to provide a compact magnetic type-operating apparatus of simple arrangement for recording and reproduction of sounds which is adapted for use either with an endless loop type cartridge or a coplanar type cassette.

Another object of the invention is to provide a magnetic tape-operating apparatus for recording and reproduction of sounds which enables cassette tape-driving means to be reliably and accurately brought to an operative position.

The tape-operating apparatus for recording and reproduction of sounds (hereinafter simply referred to as a "tape-operating apparatus") of this invention comprises a movable frame for supporting casette tape-operating means and guide means for guiding the movable frame to an operative position by first lifting it obliquely upward and then moving it horizontally. This arrangement enables the casette tape-operating means to be accurately brought to an operative position by being moved horizontally without fail immediately before taking said position. A capstan is moved toward a pinch roller perfectly in a horizontal direction, saving a magnetic tape clamped therebetween from undesirable strains or torsions.

The tape-driving apparatus of this invention further comprises a first wheel coupled to an electric motor, a second wheel coupled to a cassette tape capstan and an idler mounted on the movable frame so as to operatively couple both wheels together. Under this arrangement, the idler moves horizontally immediately before coupling both wheels together and is saved from undesirable frictions or torsions which might otherwise be caused by the wheels.

BRIEF DESCRIPTION OF THE DRAWING

FIGS. 1A and 1B are miniature plan and side views of a typical endless loop type cartridge;

FIGS. 2A and 2B are miniature plan and side views of a typical coplanar type cassette;

FIG. 3 is a plan view, partly in section, of the tape-operating apparatus of this invention;

FIG. 9 schematically shows a solenoid-exciting circuit;

FIG. 10 is a sectional view on line 10—10 of FIG. 9;

FIG. 11 is a plan view of a movable frame;

FIG. 12 is a plan view, partly in section, of the apparatus showing a second actuating member;

DETAILED DESCRIPTION OF THE PREFERRED EMBODIMENT

Figure 4:
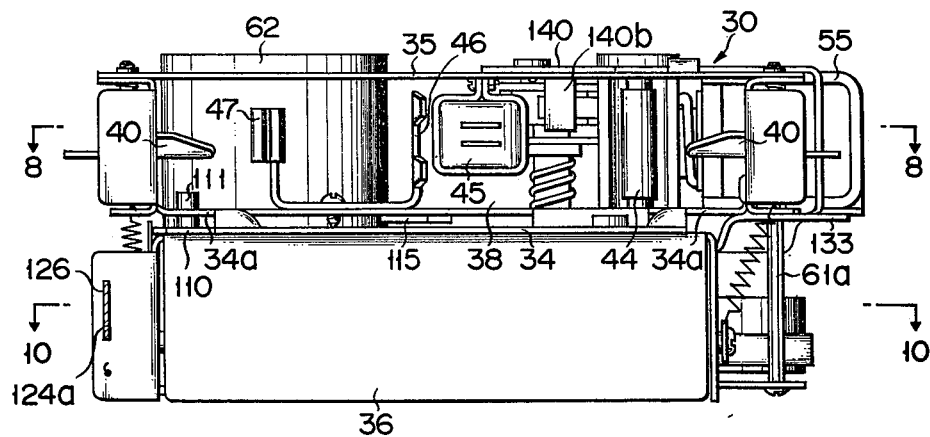
FIG. 4 is a right side view of the same.

FIGS. 1A and 1B jointly set forth the known endless loop type cartridge 20 ("Lear Jet" type 8-track cartridge). The cartridge 20 containing a pinch roller 21 has substantially flat upper and lower surfaces, and is provided on one lengthwise side with a depression 22 with a V-shaped cross section into which the later described press roller is fitted upon insertion of the cartridge 20. The cartridge 20 further has a pair of chamfered portions 23 formed at both corners of the forward or insertion side.

FIGS. 2A and 2B jointly present the known coplanar type cassette 24. This cassette 24 consists of a body 25 for receiving a tape reel and a thicker portion 26 extensively formed over the lengthwise center, into which a magnetic head and pinch roller are inserted in application. The thicker portion 26 is spaced at an interval W from both crosswise sides of the body 25, and is raised to a height S above the upper and lower surfaces of the body 25. The body 25 is bored with holes 27 for insertion of reel shafts, and the thicker portion 26 is bored with holes 28, 29 for insertion of a capstan and set pins. The cassette 24 has a lengthwise width substantially equal to the crosswise width of the cartridge 20 and a smaller thickness and length than the cartridge 20.

The tape-operating apparatus of this invention is constructed in consideration of the different shapes and functions of the cartridge and cassette.

FIGS. 3 to 6 jointly indicate a compact sound recording and reproducing device 30 used, for example, with automobiles. This device 30 has a frame assembly 31, which consists of an upper frame unit 32 having a pair of upright lengthwise walls 33 with a bottom plate 34 placed therebetween, an upper plate 35 screwed to flaps 33a formed on the lengthwise walls 33 and a lower frame unit 36 screwed to the underside of the upper frame unit 32. The later described movable frame 37 is movably supported on the lower frame unit 36 (FIG. 7).

The upper frame unit 32 and upper plate 35 jointly define a common free space 38 (FIG. 4) for admission of the cartridge 20 and cassette 24. The width of the free space, namely, an interval between the lengthwise walls of the upper frame unit 32 is made substantially equal to the insertion width of the cartridge and cassette. The bottom plate 33 of the upper frame unit 32 has a pair of raised portions 33a. These raised portions 33a extend parallel at an interval substantially equal to the lengthwise width of the thicker portion 26 of the cassette 24 and project upward above the bottom plate 33 to a height substantially equal to the height S of the thicker portion 26. An interval between the upper plane of the raised portions 33a and the underside of the upper plate 35 is made substantially equal to the thickness of the cartridge 20.

Figure 5:
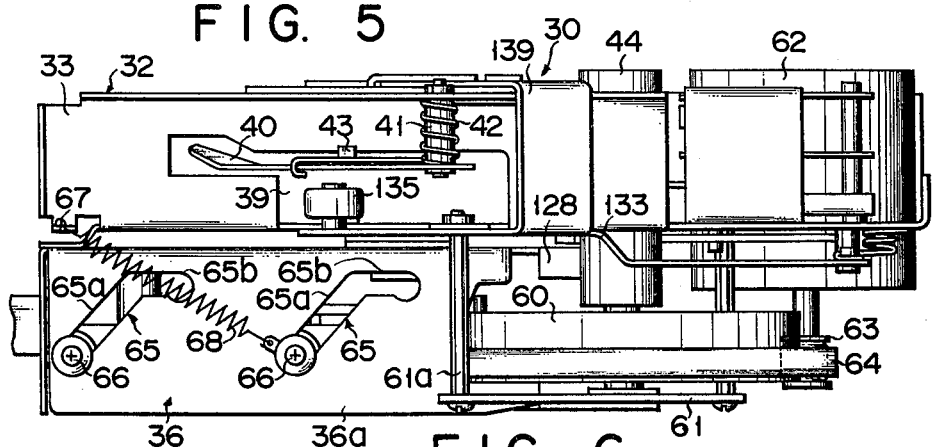
FIG. 5 is a back view of the same.
Figure 6:
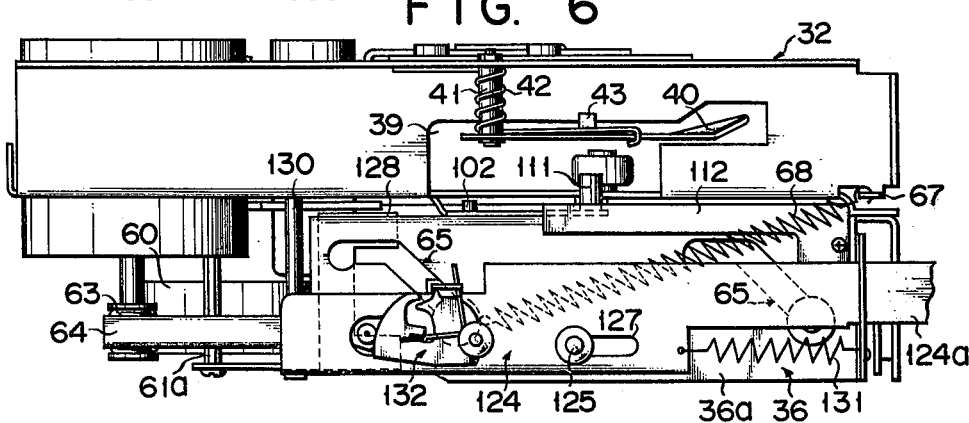
FIG. 6 is a front view of the same.
Figure 7:
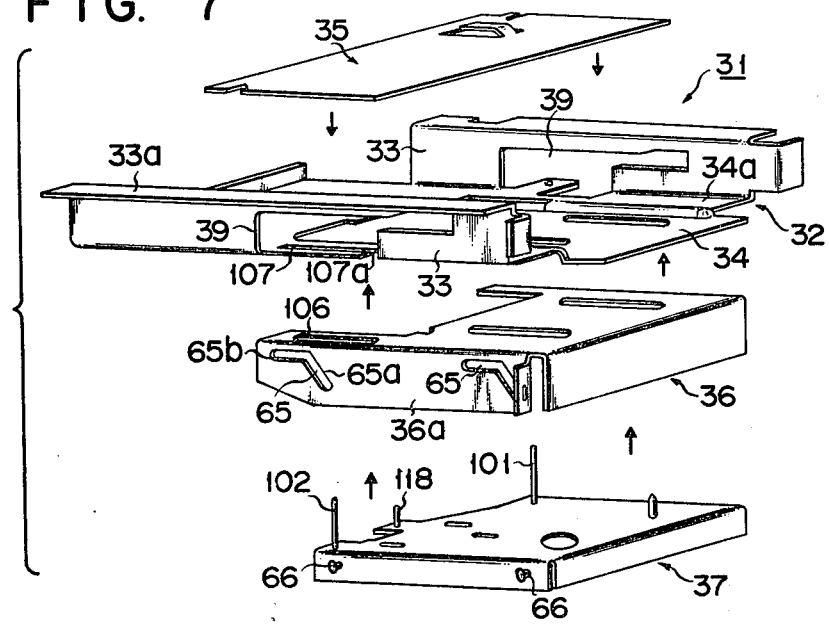
FIG. 7 is a miniature exploded view of a frame assembly.
Figure 8:
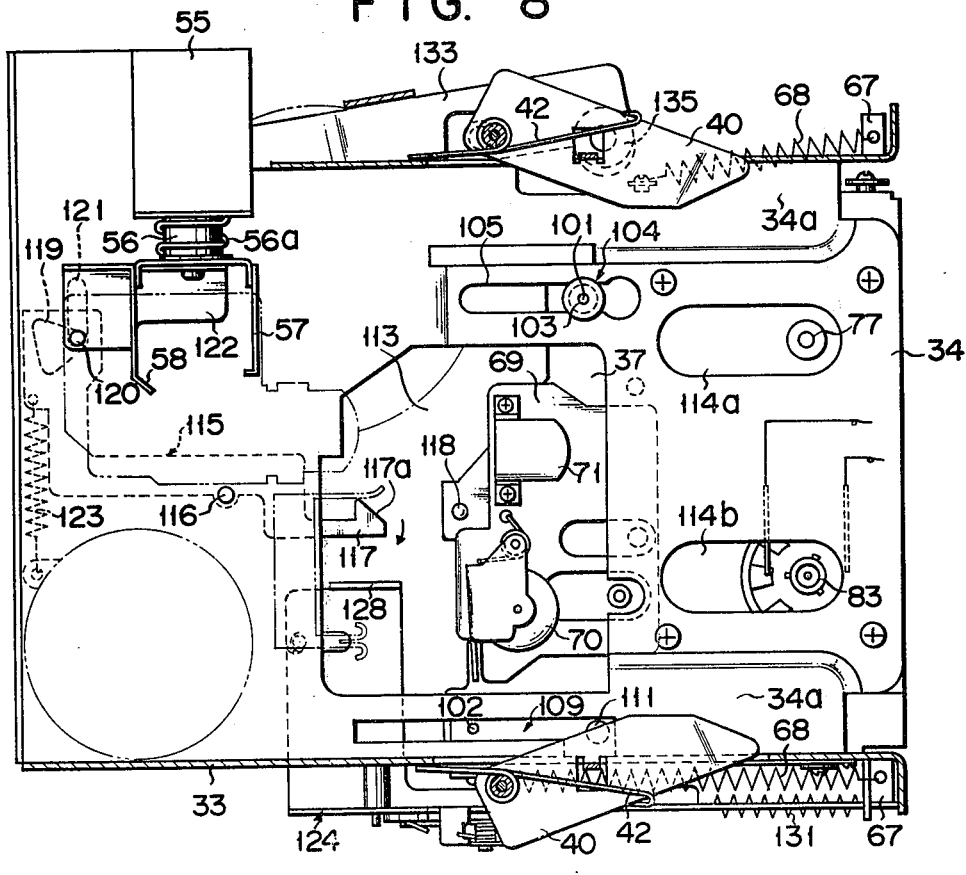
FIG. 8 is a sectional view on line 8—8 of FIG. 4.

The lengthwise walls 33 of the upper frame unit 32 are each bored with a hole 39, in which a plate-like guide member 40 is placed (FIGS. 5, 6 and 8). The guide member 40 is fitted at one end to the lower end of a support rod 41 rotatably and in a substantially horizontal direction. The guide member 40 is urged into the free space 38 through the hole 39 by a torsion coil spring 42 for abutment against each lengthwise wall 33 of the upper frame unit 32 through a stopper 43. An interval between the underside of the guide member 40 and the upper plane of the raised portion 33a is made substantially equal to the thickness of the body 25 of the cassette 24.

Cartridge tape-operating means including a capstan 44, magnetic head 45, tape guide 46 and conductor 47 is provided in the forward portion of the upper frame unit 32 as viewed in the direction indicated by the arrow A of FIG. 3, namely, in the direction in which the cartridge 20 is inserted into the free space 38. It will be noted that the term "portion" and "rear portion" are defined to mean those as viewed in the direction in which the cartridge 20 and cassette 24 are pushed into the free space 38.

The magnetic head 45 is fitted to the known tape track-changing mechanism 48 mounted on the upper frame unit 32. This tape track-changing mechanism 48 includes a solenoid 55 (FIG. 8) provided with a slidable rod 56. When retracted by excitation of the solenoid 55, the slidable rod 56 moves the magnetic head 45 vertically as is well known. The solenoid 55 is excited when a metal foil attached to the cartridge tape touches the conductor 47 and also when a switch 59 is closed (FIG. 9).

The capstan 44 penetrates the upper frame unit 32 and is provided with a fly-wheel 60 at the lower end. The capstan 44 and fly-wheel 60 are supported, as shown in FIG. 10, on a support plate 61 fixed to the upper frame unit 33 by means of support rods 61a. The known electric motor 62 (FIG. 5) is fixed to the upper frame unit 32. The rotary shaft of the motor 62 extends below the upper frame unit 32 and is fitted with a pulley 63. A rubber belt 64 is operatively stretched between the pulley 63 and flywheel 60.

Both lengthwise walls of the lower frame unit 36 are each bored with two guide slots 65 of substantially the same shape. The guide slot 65 consists of an inclined portion 65a extending obliquely upward and a horizontal portion 65b extending horizontally from the upper end of said inclined portion 65a (FIG. 5). The movable frame 37 disposed below the lower frame unit 36 is movably supported in a horizontal state by guide rollers 66 movably engaging the guide slots 65. Tension springs 68 are stretched between the forward guide rollers 65 and lugs 67 formed on the upper frame unit 32 to urge the movable frame 37 to a rearward and downward or inoperative position. As shown in FIG. 11 the movable frame 37 is fitted with the undermentioned cassette tape-operating means. A movable plate 69 holding a cassette tape pinch roller 70 and magnetic head 71 is mounted on the forward upper portion of the movable frame 37. The movable plate 69 has support rods 72 slidably engaging elongate guide slots formed in the movable frame 37 and is spaced at a prescribed interval from the upper surfaces of the movable frame 37 by spacer rings 74 surrounding the support rods 72. The movable frame 37 is fitted with a pair of cassette-setting pins 75. A wire spring 76 is stretched between the cassette-setting pins 75 and pressed at the center against one of the support rods 72 to urge the movable plate 69 forward. The movable frame 37 is fitted with an upward projecting fixed cassette tape reel shaft 77. A bottom plate 78 is fixed by support rods 79 below the movable frame 37 (FIG. 10). A cassette tap capstan 80 provided with a fly-wheel 81 and pulley 82, and a tape takeup reel shaft 83 fitted with a pulley 84 are rotatably mounted on the bottom plate 78. The capstan 80 penetrates the movable frame 37 and projects upward through a slot 85 formed in the movable plate 69. The tape takeup reel shaft 83 projects upward through a circular hole 86 formed in the movable frame 37 and is operatively coupled to the capstan 80 through a belt 87 stretched between the pulleys 82, 84. The pulley 84 of the tape takeup reel shaft 83 contains the known friction of slip coupler and makes a delayed rotation under the later described condition. The pulley 84 is further provided with the known detection means (FIG. 9) including a solenoid-exciting circuit 90. This circuit 90 actuates the solenoid 55 when the pulley 84 is brought to rest. A support plate 91 carrying a rubber idler 92 is slidably mounted on the bottom plate 82 to couple the fly-wheels 60, 81 together. The support plate 91 is bored with two slots 93, 94 into which guide pins 95, 96 fixed to the bottom plate 78 are fitted. The guide pins 95, 96 hold the support plate 91 on the bottom plate 78 through support rings 97, 98. One slot 93 is elongate with a width equal to the diameter of the guide pin 95, and the other slot 94 is rectangular with a larger width than the diameter of the guide pin 96. Accordingly, the support plate 91 can move lengthwise of the slot 93 and also rotate about the guide pin 95 within a certain range. A tension spring 100 is stretched between the guide pin 95 and a lug 99 formed on the support plate 91 to urge said support plate 91 to a position indicated in a solid line in FIG. 10.

The tape-driving apparatus of this invention comprises actuating means for bringing the movable frame 37, cassette tape pinch roller 70, magnetic head 71 and capstan 80 all to an operative position. A pair of forwarding pins 101, 102 project upward from the movable frame 37, as shown in FIG. 11. One forwarding pin 101 is inserted into the central hole 103 of a first actuating member 104 slidably engaging an elongate slot 105 formed in the bottom plate 34 of the upper frame unit 32 (FIG. 8). The other forwarding pin 102 is inserted into a through hole 108 formed in a second actuating member 109 movably resting on the lower frame unit 36 (FIG. 12). The second actuating member 109 is provided with an engagement pin 111 projecting upward through a slot 107 and is urged into the frame assembly 31 by a relatively weak plate spring 112 fixed to the lower frame unit 36. The engagement pin 111 is so positioned as to engage the chamfered portion 23 of the cartridge 20 when it is inserted into the free space 38. The slot 107 is provided with an escapement slot 107a to enable the engagement pin 111 to be forced out of the free space 38 when the cartridge 20 is inserted thereinto.

The bottom plate 34 of the upper frame unit 32 is bored with a hole 113 for the movable plate 69 so as to cause the movable frame 37 and cassette tape-operating means to be freely brought to an operative position and also with slots 114a, 114b for insertion of the reel shafts 77, 83.

The tape-driving apparatus of this invention further comprises a lock mechanism (FIG. 8) for keeping the movable frame 37 in an operative position. The lock mechanism has a lock arm 115 rotatably fitted to the underside of the upper frame unit 32 by a pin 116. The lock arm 115 has a pawl 117 engageable with a pin 118 disposed in the forward portion of the movable frame 37. The lock arm 115 which is normally urged to a position shown in FIG. 8 by a tension spring 123 is made to rotate clockwise by a pin 120 upon excitation of the solenoid 55.

The tape-driving apparatus of this invention further comprises a cassette tape-fast forwarding mechanism (FIGS. 6 and 10). The fast-forwarding mechanism includes a fast-forwarding arm 124, the rear portion 124a of which slidably engages the guide hole 126 (FIG. 4). The guide pin 125 provided on one lengthwise wall 36a of the lower frame unit 36 slidably engages a slot 127 (FIG. 6). The forward end portion of the fast-forwarding arm 124 is horizontally bent below the lower frame unit 36 and then is turned upward to form an upright stopper 128 for the movable plate 69 of the movable frame 37. A rod 130 fixed to the upper frame unit 32 is slidably fitted into a slot 129 formed in the horizontal bend of the fast-forwarding arm 124. The arm 124 which is normally urged to the indicated position by a tension spring 131 is kept in a forward or fast-forwarding position by the known lock mechanism 132 engaging a pin 132a when the rear portion 124a of the arm 124 is pushed forward. When the rear portion 124a is pushed forward again, the lock mechanism 132 is disengaged from the pin 132a to bring the arm 124 to the normal position by the tension spring 131.

The tape-driving apparatus of this invention further comprises a cartridge-pressing mechanism. The pressing mechanism is formed, as shown in FIG. 3, of a support plate 133 rotatably mounted on the upper frame unit 32 and a press roller 135 fitted to the support plate 133. The support plate 133 which is normally kept in a solid line position shown in FIG. 3 (or an inoperative position) is made to take a chain line position shown in FIG. 3 (or an operative position) by passing through the hole 39 when the inserted cartridge 20 pushes forward a projection 140b of a movable plate 140 which engages an arm 139 projecting from the plate 133.

Figure 13A:
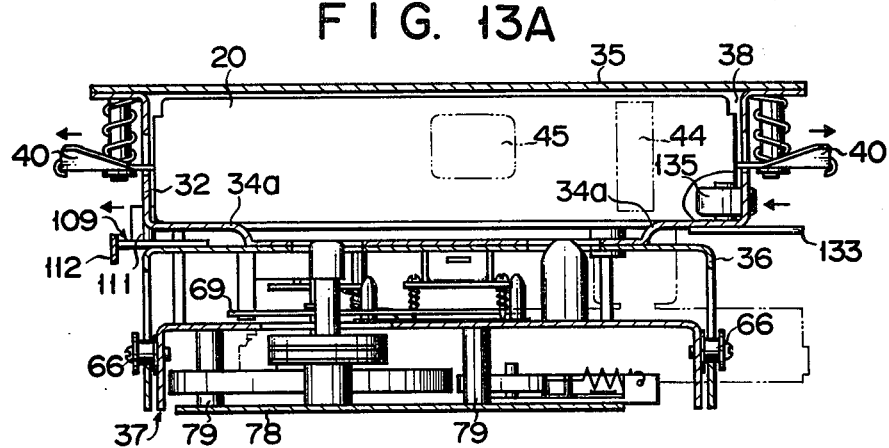
FIGS. 13A and 13B are sectional views of apparatus, as viewed in the direction in which the cartridge and the cassette are inserted into the subject apparatus, respectively.
Figure 13B:
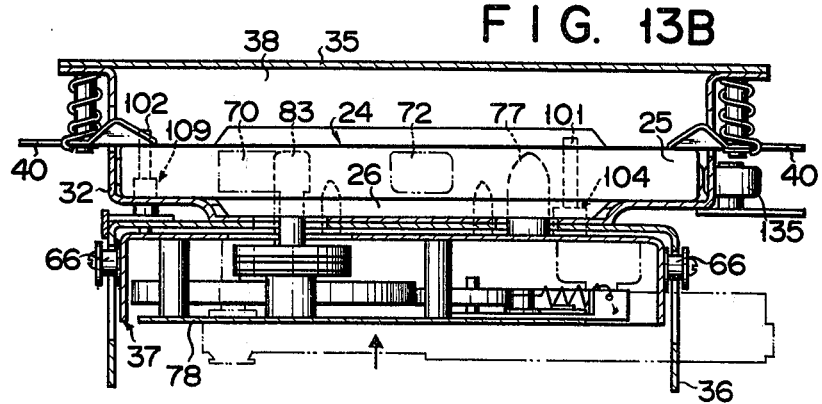

There will now be described the operation of the subject tape-driving apparatus. When the cartridge 20 is pushed into the free space 38 in the direction indicated by the arrow A of FIG. 3, both guide members 40 are forced, as shown in FIG. 13A, out of the free space 38 by the cartridge 20 to guide the lengthwise walls of the cartridge 20. At this time, the engagement pin 111 of the second actuating member 109 is forced into the escapement slots 107a by the chamfered portions 23 of the cartridge 20 against the force of the spring 112 (as indicated in a chain line in FIG. 12). The cartridge 20 which is now placed on the raised portions 33a of the bottom plate 33 of the upper frame unit 32 passes over the first actuating member 104 without touching it, causing the movable frame 37 to be kept in an inoperative position. When the cartridge 20 advances further into the free space 38, then the end face of the cartridge 20 pushes the projection 140b of the movable plate 140 to bring the press roller 135 to a chain line position shown in FIG. 3. As the result, the press roller 135 is firmly fitted into the depression 22 formed in one lengthwise side of the cartridge 20 with a V-shaped cross section, causing the cartridge tape to be firmly pressed against the capstan 44, tape guide 46 and conductor 47. At this time, the forward end of the inserted cartridge 20 actuates the known switch means (not shown) and in consequence a sound recording and reproducing circuit for a cartridge tape (not shown). When the cartridge 20 is drawn out upon completion of the operation of the tape, the press roller 135 is brought back to the solid line position of FIG. 3 by the inner walls of the cartridge depression 22. The aforesaid switch means (not shown) is automatically thrown open.

When the cassette 24 is inserted into the free space 38 in the direction indicated by the arrow A of FIG. 3, then the guide members 40 guide the upper surface of the body 25 of the cassette 24. The body 25 and thicker portion 26 of the cassette 24 abut against the second and first actuating members 109, 104 respectively to advance them together with the forwarding pins 102, 101, bringing the movable frame 37 to an operative position. The above-mentioned process of operation is schematically illustrated in FIGS. 14A to 14D.

Figure 14A:
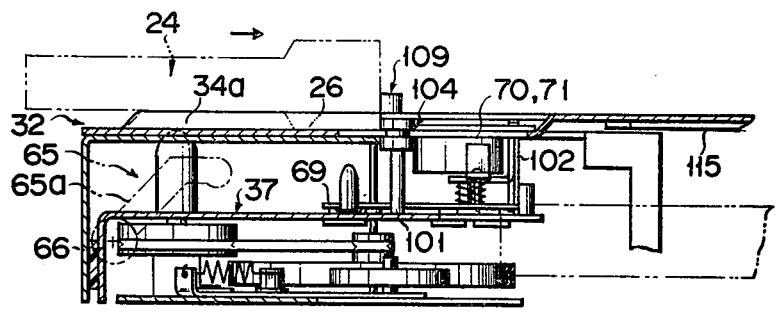
FIGS. 14A to 14D are sectional views of the cassette progressively inserted into the subject apparatus.
Figure 14B:
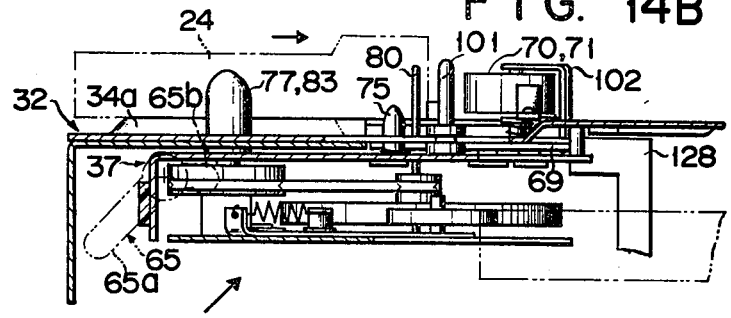

When the cassette 24 is pressed against the upper larger diameter portion 104b of the first actuating member 104 and engagement pin 111, the movable frame 37 takes the lowermost and rearmost inoperative position (FIG. 14A). When the cassette further advances, the first and second actuating members 104, 109 carry forward the movable frame 37 by means of the forwarding pins 101, 102. At this time, the inclined portions 65a of the guide slots 65 lift the movable frame 37 obliquely upward by means of the guide rollers 66, causing the movable frame 37 to be shifted from the position of FIG. 14A to that of FIG. 14B.

Figure 14C:
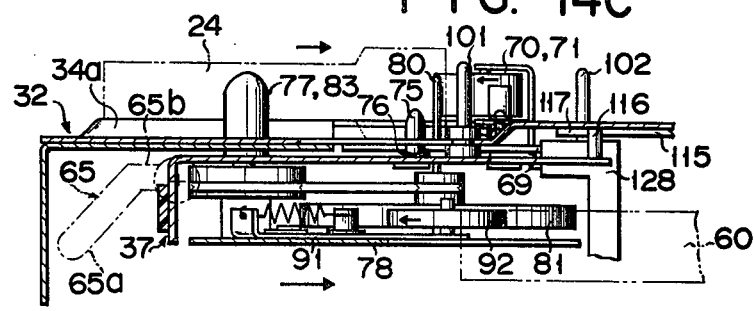

The set pins 75, capstans 80 and reel shafts 77, 83 pass into the corresponding holes of the cassette 24. The pinch roller 70 and magnetic head 71 are introduced into the free space 38 through the hole 113 of the upper frame unit 32. The movable plate 69 abuts against the stopper 128 of the fast-forwarding arm 124. When the cassette 24 moves further into the free space 38 than a position shown in FIG. 14B, then the movable frame 37 is guided horizontally along the horizontal portions 65b of the guide slots 65. Since, at this time, the movable plate 69 is kept at the position of FIG. 14B by the stopper 128, the tape of the inserted cassette abuts against the magnetic head 71 and is tightly clamped between the pinch roller 70 and capstan 80 (FIG. 14C). The bottom plate 78 travels forward together with the movable frame 37 to press the idler 92 against the fly-wheel 60, just before the movable frame 37 takes the foremost position. In this case the idler 92 suitably touches the fly-wheels 60, 81 by the self-controlling action of the support plate 91 (as indicated in a chain line in FIG. 10). The pin 118 of the movable frame 37 engages the pawl 117 of the lock arm 115, causing the movable arm 37 to take the position of FIG. 14C. Upon advance of the movable frame 37, the forwarding pin 102 projecting through the hole 108 of the second actuating member 104 actuates a switch means (not shown) and in consequence a sound recording and reproducing circuit (not shown) for the cassette tape. As the result, the motor 62 drives the fly-wheel 81 through the pulley 63, belt 64, and idler 92. Though the takeup reel shaft 83 tends to rotate at a higher peripheral speed than the capstan 80, the tape clamped between the capstan 80 and pinch roller 70 runs at the same speed as the peripheral speed of the capstan 80. As the result, the friction or slip coupler received in the pulley 84 of the takeup reel shaft 83 makes a delayed rotation, i.e., the shaft 83 rotates at the same peripheral speed as the capstan 80.

Figure 14D:
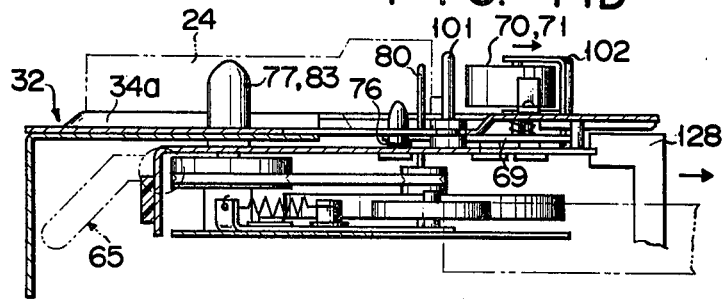

When the cassette tape 24 is wound about the takeup reel shaft to the full, the reel shaft 83 is brought to rest by the tension of that terminal portion of the tape which is stretched between both reel shafts, causing the solenoid-exciting circuit 90 to actuate the solenoid 55 (FIG. 9). As the result, the lock arm 115 rotates clockwise to release the pin 116 of the movable frame 37. The movable frame 37 is brought back to the original position of FIG. 14A by the tension springs 68, and the cassette 24 is forced backward by the actuating members 104, 109, causing the switch means (not shown) to be automatically thrown open. When the switch 59 of the tape track-changing mechanism 48 is closed with a desire to release the cassette 24 while the tape is still running, then the solenoid 55 is similarly excited to disengage the pin 116 of the movable frame 37. When the rear portion 124a of the fast-forwarding arm 124 is pushed forward with a desire to carry out the fast run of the cassette tape, then the stopper 128 is removed from the movable plate 69 as shown in FIG. 14D. At this time, the movable plate 69 is carried forward by the wire spring 76 to disengage the pinch roller 70 from the capstan 80. As the result, the takeup reel shaft 83 is rotated by the pulley 84 without the delayed rotation of the friction coupling received in said pulley 84, thereby effecting the fast run of the cassette tape. Where the rear portion 124a of the fast forwarding arm 124 is again pushed forward when the cassette tape is brought to any desired point, then the stopper 128 forces the movable plate 69 back to the position of FIG. 14C.

What we claim is:

1. A magnetic tape recording and/or reproducing apparatus for selectively operating an endless type cartridge or coplanar type cassette, comprising:
    a main frame having a single space for receiving a cartridge or cassette;
    a cartridge operating means including cartridge tape transport means fixed to said main frame positioned to operate a cartridge inserted within said space;
    a movable frame fitted with cassette operating means including cassette tape transport means having a first capstan and a pinch roller;
    means mounting said movable frame on said main frame;
    means guiding said movable frame for movement between a first position where the cassette tape operating means is in said space and in operative position with a cassette inserted in said space and a second position where the cassette tape operating means is out of said space;
    a first spring means normally urging said movable frame to said second position;
    actuating means for shifting said movable frame to said first position against said first spring means responsive to the insertion of a cassette into said space; and, said cassette transport means further including:
    a motor mounted on said main frame;
    a first wheel mounted on said main frame and driven by said motor;
    a second wheel mounted on said movable frame and operatively coupled to said first capstan;
    an idling wheel mounted on said movable whereby said first wheel and said second wheel are operatively coupled together when said movable frame is brought to said first position.

2. A magnetic tape recording and/or reproducing apparatus according to claim 1 wherein said guiding means define a travelling path for said movable frame, which includes a first path section extending obliquely upward from said second position and a second path section extending horizontally from the end of said first path section to said first position, said idling wheel being so positioned on said movable frame as to operatively engage said first wheel when said movable frame is travelling along said second path section.

3. A magnetic tape and/or reproducing apparatus according to claim 2 further comprising a second capstan for the cartridge and operatively coupled to said first wheel.

4. A magnetic tape and/or reproducing apparatus according to claim 2 further comprising a support plate mounted on said movable frame so as to be movable relative thereto, said idling wheel being attached to said support plate, and a wheel pressing spring stretched between said movable frame and said support plate so as to elastically press said idling wheel against said first wheel and said second wheel through said support plate when said movable frame is brought to said first position.

5. A magnetic tape recording and/or reproducing apparatus according to claim 4 wherein said idling wheel is made of rubber.

6. A magnetic tape recording and/or reproducing apparatus according to claim 2 further comprising a movable plate mounted on said movable frame so as to be movable parallel thereto, sain pinch roller of said cassette operating means being attached to said movable plate and said first capstan being attached to said movable frame, a second spring means disposed between said movable frame and said movable plate so as to normally urge said pinch roller, attached to said movable plate, and said first capstan, attached to said movable frame, to be operatively disengaged, and a stop mounted on said main frame and so positioned as to abut to said movable plate against the normal urging of said second spring means when said movable frame approaches said second position, thereby pressing said pinch roller against said first capstan.

7. A magnetic tape recording and/or reproducing apparatus according to claim 6 further comprising a fast-forwarding arm mounted on said frame so as to be movable in the travelling direction of said movable frame, said stop being fixed to said fast-forwarding arm so as to permit said second spring means to operatively disengage said pinch roller from said first capstan when said fast-forwarding arm is moved in the travelling direction of said movable frame.

* * * * *